T. SHAW.
Plug-Valve.

No. 162,773.

Patented May 4, 1875.

Witnesses: Wm. F. Brey.  Wm. Garwood.

Inventor. Thomas Shaw

UNITED STATES PATENT OFFICE.

THOMAS SHAW, OF PHILADELPHIA, PENNSYLVANIA.

IMPROVEMENT IN PLUG-VALVES.

Specification forming part of Letters Patent No. 162,773, dated May 4, 1875; application filed March 10, 1875.

*To all whom it may concern:*

Be it known that I, THOMAS SHAW, of the city and county of Philadelphia, Pennsylvania, have invented a new and Improved Plug-Valve; and I hereby declare the following to be a full, clear, and exact description of the same, reference being had to the accompanying drawing, and to the letters of reference marked thereon.

My invention consists in the peculiar construction for the purpose hereinafter described.

The object of the invention is to substitute the ordinary hard-leather valve, and to secure a tight joint, to prevent leakage and the consequent freezing.

In order to enable others to use and practice my invention, I will proceed to describe its construction and operation.

Figure 1:
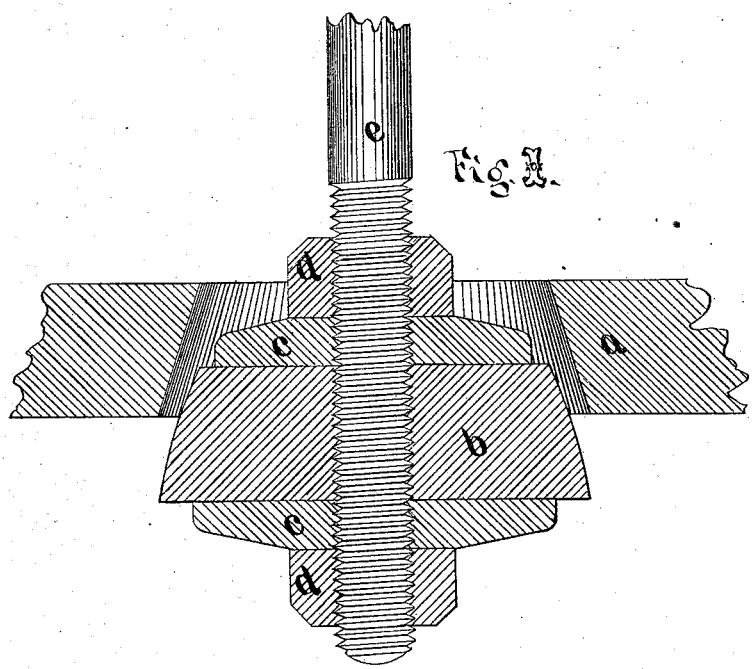
Figure 2:
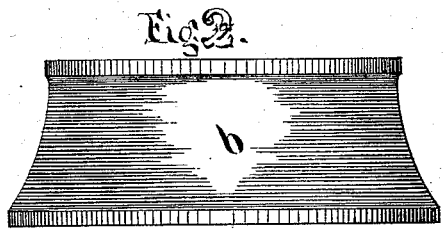

On reference to the accompanying drawings, which form a part of this specification, Figure 1 represents a vertical section through the center of valve-seat of an ordinary fire-plug; and Fig. 2 represents the improved gum valve $b$ previous to bolting up, showing a concave surface on its periphery. The same valve $b$ is shown in Fig. 1, clamped hard between ordinary washers $c$ and nuts $d$, through the center of which passes the bolt or plug-rod $e$.

It is important, when securing this valve in position, that the valve be bolted up with a pressure exceeding the fluid-pressure the valve has to sustain. This necessarily severe pressure distorts the valve by giving a too great convexity to the periphery of valve, and renders the valve liable to cut and ultimately leak. This difficulty is avoided by molding the valves with a concave periphery, as shown in Fig. 2.

It will be evident that the described shape can be modified without any alteration in the result.

What I claim, and desire to secure by Letters Patent, is—

The elastic valve $b$, with a concave periphery, as described, for the purpose set forth.

THOMAS SHAW.

Witnesses:
    WM. F. BREY,
    WM. GARWOOD.